Nov. 24, 1964 A. LIBERMAN 3,158,686
COMMUNICATION SYSTEM
Filed July 5, 1962

Inventor:
Arie Liberman.
By. Hofgren, Brady, Wegner.
Allen & Stellman.
Attorneys.

United States Patent Office 3,158,686

Patented Nov. 24, 1964

3,158,686
COMMUNICATION SYSTEM

Arie Liberman, Skokie, Ill. (% Talk-A-Phone Co., 5013 N. Kedzie Ave., Chicago 25, Ill.)

Filed July 5, 1962, Ser. No. 207,634
4 Claims. (Cl. 179—1)

This invention relates to a communication system and, more specifically, to an intercommunication system which is directional in nature.

In the past, many intercommunication systems have been developed for communicating between remotely located stations. Generally, these incorporate switching circuitry, allowing the operator of the station to determine whether the station is to send or receive signals. Of necessity, these systems require the use of the operator's hands to perform the switching function and incorporate unnecessary wire connections between the stations.

It is an object of this invention to provide an improved communication system.

It is a further object of this invention to provide an inexpensive communication system for allowing directional transmission of messages with a reduced cost of installation, without requiring the operator to manipulate any switches to accomplish this end.

Accordingly, it is one feature of the invention to provide a communication system comprising a pair of communication stations each including a transducer, an amplifier, and a relay controlling a switch, means interconnecting the amplifiers, and means coupling the amplifiers of the stations to actuate the relay in the other station for conditioning the system to transmit signals in one direction in response to a signal received at one of said transducers.

It is a further feature of this invention to provide a communication system utilizing a receiving and transmitting transducer at individual stations having their terminals switchably conected so that signals may be transmitted in one direction only.

It is a further feature of this invention to provide in an intercommunication system a control circuit actuated by a first receiving and transmitting transducer when transmitting electrical signals to a switch, a second receiving and transmitting transducer to produce sound signals.

Further features and advantages of the invention will readily be apparent from the following specification and from the drawings, in which.

Figure 1:
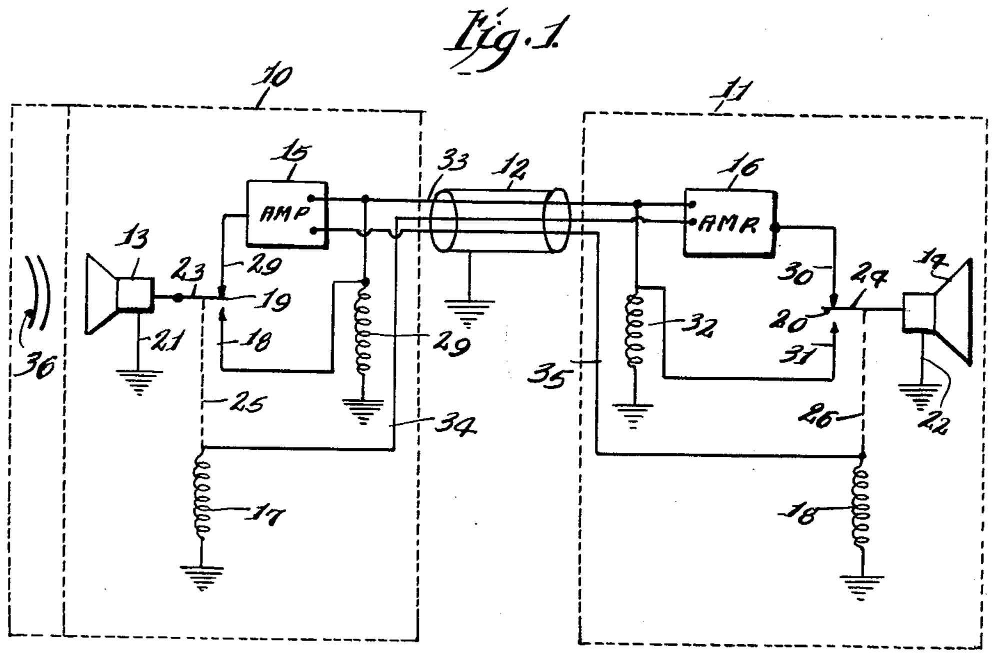
FIGURE 1 is a schematic diagram of one embodiment of the invention.

In FIGURE 1 a first communication station 10 and a second communication station 11 are interconnected by a multiple wire cable 12. Included within each station 10, 11 are transmitting and receiving transducers 13, 14; amplifiers 15, 16 and relays 17 and 18 controlling switches 19, 20.

The operation of the communication system is generally as follows. A signal received by transducer 13 is amplified through amplifier 15, and the output thereof is coupled to the station 11 through cable 12. Transducer 14 is conditioned by relay 18 and switch 20 to transmit the received signal, and a message is communicated from an operator at station 10 to a listener at station 11. In a similar manner, transducer 14, should it receive a sound signal, will transmit the signal through its amplifier 16 to the transducer 13.

Transducers 13, 14 are of a standard type which are designed for both receiving audio signals and converting them into an electrical output and for receiving electrical signals and producing an audio signal therefrom.

In the embodiment shown in FIGURE 1, one terminal of each of the transducers 13 and 14 is coupled, respectively, through wires 21, 22 to a point of reference potential, in this case ground. The other terminal of each transducer is connected through individual wires 23, 24 to the blades of switches 19, 20. Dashed lines 25 and 26 represent the mechanical coupling between relays 17, 18 and the switch blades 19, 20. In the de-energized condition of the relays, the switches are in the positions shown, connecting each transducer to the amplifier input. A pair of switch contacts 18, 29 associated with switch blade 19 are connected, respectively, to the input of amplifier 15 and the output of the amplifier as represented by the coil 29. In a similar manner, a pair of contacts 30 and 31 are associated with switch blade 20 and are connected to the input of amplifier 16 and output thereof represented by a coil 32. A wire 33 in cable 12 interconnects the outputs of amplifiers 15 and 16. This connection reduces the number of wires between the stations.

A wire 34 connects the coil of relay 17 to amplifier 16 and a wire 35 connects relay 18 to amplifier 15. These wires are shown along with wires 33 in cable 12, which, in this instance, is a shielded cable interconnecting the two remotely placed stations.

Assuming that the operator at station 10 wishes to communicate with a listener at station 11, the system operates as follows. An audio signal designated by the lines 36 is produced by the operator at station 10 causing transducer 13 to generate an electrical signal which corresponds to the audio signal. This electrical signal is coupled through wire 23, switch blade 19 and contact 27 to amplifier 15 which amplifies the signal and develops an output across coil 29. At the same time, a portion of amplifier 15 generates a control signal which actuates relay 18, moving switch blade 20 to its lower position in contact with contact 31. Thus, transducer 14 is connected to the output of amplifier 15 and an audio signal is produced. It is impossible for the listener at station 11 to transmit a signal to station 10 while receiving a message from station 10 since the output of transducer 14 is not connected to the input of amplifier 16. Upon completion of the message from the operator at station 10, relay 18 is de-energized, switch blade 20 is returned to its upper position, and both stations are now conditioned to originate a signal. The listener at station 11 may now transmit a message to station 10 through amplifier 16 which actuates relay 17 to move switch blade 19 to its lower position and couples transducer 13 across the output of amplifier 16.

Figure 2:
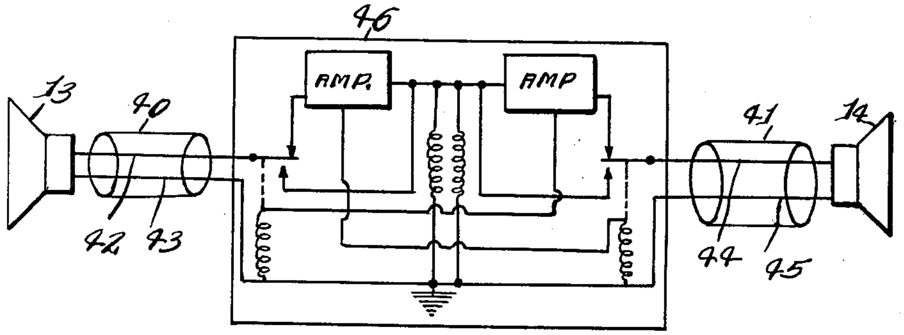
FIGURE 2 is a schematic diagram of a second embodiment of the invention.

FIGURE 2 shows a second embodiment of the invention wherein a pair of transducers are shown coupled through a pair of cables 40, 41 each including a pair of wires 42, 43 and 44, 45 to an amplifying and control circuit 46. Circuit 46 includes a pair of amplifiers and circuitry similar to that shown in FIGURE 1, which operates in a manner similar to that of FIGURE 1. In this instance, it is possible to locate the transducers remotely at any desired point and to locate the control circuit 46 at a central position, preferably convenient to a source of operating potential. With this embodiment of the invention, it is only necessary to run the simple cables 40, 41 to the transducers thus, improving the ease of installation and the flexibility of the system.

I claim:

1. A communication system comprising: a first station including a first transducer coupled to a first switch and including a first amplifier having a first input and first output, said first input connectable to said first transducer through said first switch; a second station including a second transducer coupled to a second switch and including a second amplifier having a second input and second output, said second input connectable to said second transducer through said second switch, means interconnecting the outputs of said amplifiers; a first relay in said first station coupled to said second amplifier for actuating said first switch in response to actuation of said second amplifier to couple said first transducer to said output of said second amplifier; and a second relay in said second station coupled to said first amplifier for actuating said second switch in response to actuation of said second amplifier to couple said second transducer to said output of said first amplifier.

2. A communication system comprising: first and second amplifiers having their outputs coupled in parallel; first and second relays having first and second switches operatively associated therewith and actuated thereby; first and second transducers having terminals coupled, respectively, to said first and second switches; means coupling said first amplifier to said second relay for actuating said second switch; means coupling said second amplifier to said first relay for actuating said first switch; and means including said first and second switches, for coupling said first transducer to the output of said second amplifier or to the input of said first amplifier and for coupling said second transducer to the output of said first amplifier or to the input of said second amplifier.

3. A communication system comprising: a pair of spaced transducers; means, including first and second amplifiers, and first and second relays actuating respectively first and second switches; means for interconnecting the outputs of said amplifiers; means including said first switch, for connecting said first transducer to said first amplifier; means, including said second switch, for coupling said second transducer to said second amplifier; means in said first amplifier for actuating said second relay in response to audio signals received by said first transducer; means in said second amplifier for actuating said first relay in response to audio signals received by said second transducer; means, including said first switch, for coupling said first transducer to said second amplifier when said first relay is actuated; and means, including said second switch, for coupling said second transducer to said first amplifier when said second relay is actuated.

4. A communication system comprising: first and second amplifiers each including input terminals and output terminals, the output terminals being connected together, first and second transducers; first and second switches coupled respectively to said first and second transducers; means, including said first switch, for coupling said first transducer to the input and output terminals of said first amplifier; means including said second switch for coupling said second transducer to said input and output terminals of said second amplifier, a first relay, coupled to said second amplifier, for actuating said first switch to couple said first transducer to the output terminals of said first amplifier when said second amplifier is receiving electrical signals from said second transducer; and a second relay, coupled to said first amplifier, for actuating said second switch to couple said second transducer to the output terminals of said first amplifier when said first amplifier is receiving electrical signals from said first transducer.

References Cited in the file of this patent

UNITED STATES PATENTS

| | | |
|---|---|---|
| 2,477,275 | Tschumi | July 26, 1949 |
| 2,819,340 | Brody | Jan. 7, 1958 |